United States Patent [19]
Lee

[11] Patent Number: 5,360,129
[45] Date of Patent: Nov. 1, 1994

[54] CONTAINERS FOR USE ON AIRCRAFT FOR THE PROTECTION OF AIRCRAFT STRUCTURES

[75] Inventor: Peter R. Lee, Kent, England

[73] Assignee: Royal Ordnance plc, London, England

[21] Appl. No.: 720,754

[22] PCT Filed: Nov. 8, 1990

[86] PCT No.: PCT/GB90/01724
§ 371 Date: Jul. 3, 1991
§ 102(e) Date: Jul. 3, 1991

[87] PCT Pub. No.: WO91/07337
PCT Pub. Date: May 30, 1991

[30] Foreign Application Priority Data
Nov. 8, 1989 [GB] United Kingdom ............... 8925193

[51] Int. Cl.$^5$ .................................. B65J 1/02
[52] U.S. Cl. .......................... 220/1.5; 109/495
[58] Field of Search .............. 220/1.5; 109/49.5; 89/36.01; 206/3

[56] References Cited

U.S. PATENT DOCUMENTS

| | | |
|---|---|---|
| 3,604,374 | 9/1971 | Matson et al. ............ 109/49.5 X |
| 3,955,700 | 5/1976 | Pedraza .................... 220/1.5 |
| 4,212,251 | 7/1980 | DiMartino ............... 220/1.5 X |
| 4,248,342 | 2/1981 | King et al. ................... 206/3 |
| 4,432,285 | 2/1984 | Boyars et al. ............ 109/49.5 |

FOREIGN PATENT DOCUMENTS 0247402 12/1987 European Pat. Off. .
2058661B 7/1980 United Kingdom .

Primary Examiner—Steven M. Pollard
Attorney, Agent, or Firm—Nixon & Vanderhye

[57] ABSTRACT

A cargo or luggage container adapted for use on an aircraft which container has strengthened faces made from and/or reinforced by blast resistant material and at least one weakened Face made from a material relatively unresistant to blast, the strengthened faces forming in use at least the top and bottom faces of the container whereby blast From a detonating or exploding device within the container is directed out of the container preferentially by failure of the weakened face or faces. There may be one weakened face which in use is arranged to be the face nearest to an adjacent region of the aircraft hull. Alternatively, or in addition there may be two weakened faces on opposite sides of the container which in use are arranged to be the sides facing fore and aft with respect to the longitudinal axis of the aircraft.

4 Claims, 4 Drawing Sheets

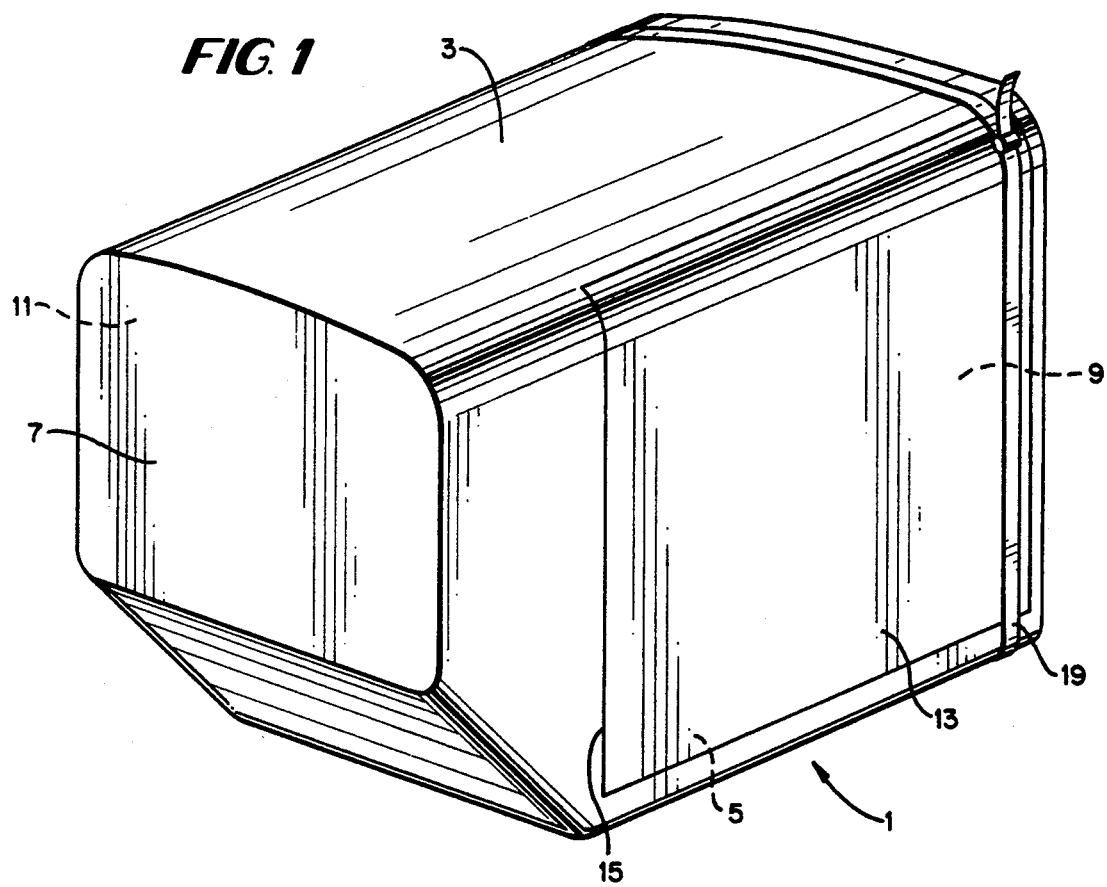
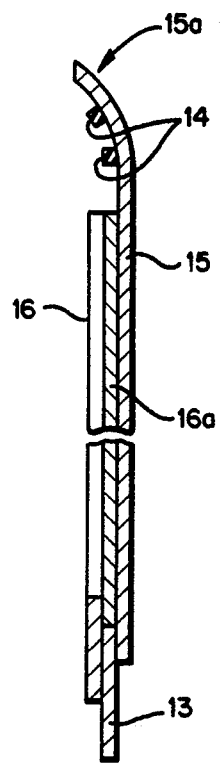

CONTAINERS FOR USE ON AIRCRAFT FOR THE PROTECTION OF AIRCRAFT STRUCTURES

BACKGROUND OF THE INVENTION

1. Field of the Invention

The present invention relates to the protection of aircraft structures from the effects of explosions.

2. Discussion of Prior Art

There have been a sufficient number of aircraft bombings, suspected bombings and foiled bombings recently for there to be dawning in the consciousness of those who travel frequently by air, the worry that their lives may soon be more at risk from deliberate damage to, as opposed to accidental failure of, the complex structures in which they travel.

The precise sequence of events following the detonation of a bomb on board an aircraft depends upon its size and location and the size and design of the aircraft. However, certain features are common to most events which have been investigated.

It has been observed that aircraft can survive the detonation of bombs on board, provided certain features are present. A bomb placed near the outer skin of the aircraft will, most probably, blow a hole in the skin and cause explosive decompression. However, it has often been the case that the aircraft can still land normally. The same seem to be the case for bombs which have exploded in the luggage compartments of the older types of aircraft. Luggage In these aircraft is contained in cargo nets, rather than the standard international luggage containers that the more modern wide-bodied aircraft use. Indeed, the accepted minimum risk position for a bomb discovered on board any type of aircraft is to place it by a door, with the interior side of the bomb tamped with cushions. The reason for choosing this position is because of the high survivability rate observed in cases of bombs planted against the aircraft hull in regions to which passengers or cleaning staff have access. These bombs rarely destroy vital electronics or hydraulic system and do not always damage significant load-bearing members so as to weaken the overall structure. Furthermore, there have been several recent cases of aircraft surviving massive losses of skin around regularly shaped fatigue failures in the hull.

However, in cases where the bomb is placed in a position not adjacent to the outer skin, severe, often fatal, damage can be caused, especially in wide-bodied aircraft.

Aircraft passenger cabin floors are relatively light structures laid on load-bearing beams. These floor beam may be tension load carriers. It is thus very possible for a bomb to damage the floor beams and, as a result, load the aircraft skin remotely from the site of the explosion asymmetrically both before and after the hull is breached by the bomb. Blast may also travel significant distances by different routes within the hollow and open channels in the aircraft structure to emerge at points well removed from the site of the bomb to cause skin and stringer rupture at several locations on the aircraft skin. Blast may also emerge into the relatively large free space of the passenger cabin and, because of the presence of rigid and substantial structures such as galleys or toilets, reflect on to the inside of the aircraft skin remote from the site of the bomb and cause unexpected damage there.

Blast emerging from the aircraft skin, at and especially remote from, the site of the bomb tends to tear irregularly shaped holes (as opposed to the cases of the more regular skin failure due to fatigue or, say, loss of a hold door). Regularly shaped holes are less often associated with catastrophic failure of the aircraft than irregularly shaped ones. Irregular holes tend to suffer enlarging and further skin damage due to the outrush of cabin air and slipstream effects.

It is possible that some modern wide-bodied aircraft may be more vulnerable to bombs of a similar size to those that have not always caused crashes of smiler aircraft. One theory is that, since the wide bodied aircraft employ a skin sheeting alloy which is only slightly thicker than that used in very much smaller aircraft, the latter are much stiffer structures than the former ones. Consequently, the smaller ones can withstand greater relative damage to their skin and stringers than the larger ones.

SUMMARY OF THE INVENTION

The purpose of the present invention is to reduce the risk of failure of an aircraft structure caused by the detonation of a bomb or other explosive device thereon.

According to the present invention there is provided a cargo or luggage container adapted for use on an aircraft which container has strengthened faces made from and/or reinforced by blast resistant material and at least one weakened face made from a material relatively unresistant to blast, the strengthened faces forming in use at least the top and bottom faces of the container whereby blast from a detonating or exploding device within the container is directed out of the container preferentially by failure of the weakened face or faces.

In a first form of the invention the container has only one weakened face which in use is arranged to be that nearest to the adjacent region of the aircraft hull.

In a second form of the invention the container has two weakened faces on opposite sides which in use are arranged to be the sides facing fore and aft with respect to the longitudinal axis of the aircraft. In this case the face adjacent to the aircraft hull may or may not also be weakened.

In the first form of the invention described above the principle is to contain a large proportion of the energy of the blast from a device detonated within the luggage container to the region of the luggage container and to reject and dump it outside the aircraft directionally from that region. The aircraft hull structure my have specially provided regularly shaped blowout panels provided in its structure which are unaffected by shocks and stresses in normal operation but which would provide an outlet for blast in the event of an explosion.

Although damage will be caused to the aircraft structure, this may be more localised (irrespective of where in the container the bomb is placed) so that there will be a good chance that the aircraft can still be controlled and subsequently landed safely.

In this form, the present invention is desirably used in conjunction with other protective measures described in UK Patent Applications 8925191, 8925192, 8925194 and 8925195 of even date by the present applicants and in a copending International Application based upon UK Patent Applications 8925194 and 8925192. Such other measures include lining of the aircraft cargo hold by a further layer of blast and fragment resistant composite material, and the provision of lightweight blast attenuating material in various strategic locations over or in ducts and channels communicating between different parts of the aircraft structure.

The protective means according to the first form of the present invention, as an illustration, functions as follows when a bomb or other explosive device in for example a bag or suitcase in a luggage container is detonated.

The bomb produces blast and some fragments. It is likely that the blast field will be highly asymmetrical because of the manner in which luggage is stowed within in the container, hard luggage cases giving a more directional effect than soft baggage.

The blast and fragments impinge on the interior walls of the luggage container within a millisecond. The luggage container is intended to maintain the confinement for a short period of time (up to a millisecond) whilst, at the same time channelling the blast effects directionally, e.g. toward the aircraft hull. By this time, the full effects of the explosion will have developed and it is possible that there may be a failure taking place somewhere else in the structure of the luggage container. The container is preferably constructed so that it falls preferentially in regions nearer to the aircraft hull, as a further aid in mitigating the effects of the bomb.

The ejecta, blast and fragments, from the side of the container nearer to the hull travel at about 1 km/s across the gap between the container and the inner part of the aircraft hull, a distance typically of about 300 mm, in about a further 0.3 milliseconds, fly the 150 mm gap to the aircraft outer skin in about 0.25 milliseconds and puncture it within a further 0.2 milliseconds after the bomb initiation.

At about 1–2 milliseconds after initiation, there is a free field blast focus initiated at each of the one or more points of failure in the luggage container and the residual effects of the explosion begin to influence the cargo hold in which the luggage container is normally stowed together with other similar containers. The hold is a compartment, or compartments, normally situated beneath the passenger cabin, which usually occupies the full width of the aircraft and which can normally accommodate luggage containers in two lines. Luggage containers are loaded from the outside through a door and my be slid along rails to their locations where they may be locked in place with latches.

The cargo hold is usually lined with a thin plastics composite material and sound and thermal insulation packs. Many channels formed by adjacent 'I' and ribs or stringers running laterally or fore and aft both open and closed, have open ends readily accessible from this cargo hold area. Thus, blast escaping from the bomb-containing luggage container may enter many of these channels and be conducted to distant points in the aircraft structure to which it would seemingly have no access. Furthermore the usual thin composite lining is insufficient to protect either the passenger cabin floor support beams or the flimsy passenger cabin floor, both of which would be subject to substantial damage due to blast and/or fragments. A large measure of blast and fragment protection can be afforded for the passenger floor beams, floor itself, the open structure channels and the aircraft belly below the cargo hold by lining the hold with a layer of blast absorbent material similar to that used to construct the luggage containers themselves. This material is desirably placed at least in regions adjacent to the ceiling of the cargo hold and its floor, especially over areas of openings of longitudinal or transverse structural channels. It is unlikely to be possible to install the material as a single unbroken protection. It may be necessary to cut holes in it at certain locations to accommodate necessary access panels, but the aim should be to utilise the material lining the hold in such a way as to protect as large as part of the vulnerable cabin floor and belly as possible.

The luggage hold lining will be subjected to the blast typically a further 0.1 milliseconds after failure of the luggage container. At this time, fragments and reflected and direct blast from within the luggage container may require further absorption by blast and fragment attenuation material lining the cargo hold and by blast absorbing materials and/or structures hold located between the passenger cabin and the cargo hold.

Blast absorbing material and/or structures forming the basis of a blast valve and blast absorbing material are preferably provided as described in the aforementioned UK Application Nos. 8925191 and 8925195 and have to function for a period of between a few tens of microseconds to a few hundreds of milliseconds to reduce the intensity of the blast entering the large open space of the passenger compartment or being transferred along open channels to distant parts of the aircraft structure. Provided such valves, blast absorbent materials, the hold lining material and the luggage container structure function correctly, the floor beams and the passenger cabin above the container will remain substantially intact. This will reduce the risk of the aircraft hull undergoing massive structural failure as a result of its distortion due to the blast.

Furthermore the presence of blast attenuating material preferably located in channels within the structure will further reduce the effects of blast along them. Hence, it is unlikely that blast which has succeeded in penetrating them will be intense enough to cause hull damage remote from the explosion site.

A frequent major cause of damage produced from a blast originating in the cargo hold is the outflow of pressurised cabin air to the atmosphere. This may take several seconds to complete for a wide-bodied aircraft. The effect of the outflowing cabin atmosphere and the slipstream on jagged ends of ruptured skin is to increase the damage to the hull and exacerbate the overall weakening of the aircraft. The effect may also be to render the aircraft difficult to control, because of offset loads. However, the protective means described herein would reduce the possibility of damage to electrical or hydraulic services by confining any skin loss to preferred localised areas surrounded by properly stressed structures, so the pilots would be afforded the fullest flying control augmentation, without the progressive deterioration of aerodynamic performance which accompanies the slipstream and air outflow effects on jagged-edged holes associated with non-localised failure.

The luggage or cargo container according to the present invention in its first form may have a loading door which is fitted in a side wall relative to the weak face adjacent to the aircraft hull, e.g. an aft facing side wall. The door may overlap internally the loading aperture it covers to provide added structural protection at the joint between the door and the edges of the side wall at the aperture. As noted above, the end walls (facing fore and aft) desirably fail preferentially at the end nearer the aircraft hull. For example, a high strength security strap may be applied around the container at the end remote from the weak face.

Alternatively, the container may comprise a hinged upper portion fitting over a fixed base portion in the manner of an alligator jaw, the luggage being loaded via the aperture formed when the upper portion is lifted. In this case, extra protection, e.g. by blast resistant material, is preferably provided along the inside of the hinged structure and along the joint between the upper and lower portions. Preferably, one of the said portions overlaps the other.

The container in the first form of the invention may also have a face adjacent to the weakened face which is curved or angled where it meets the weakened face thereby allowing the surface area of the weakened face to be reduced (relative to the other faces).

In the second form of the invention described above the principle is that the fore and aft facing weakened sides fall when a bomb or other explosive device is detonated in the luggage container and the blast is allowed to travel longitudinally along the cargo hold. It is attenuated by impact and multiple reflections at the barriers provided by other containers and at the luggage inside them.

The additional measures described above, namely the use of cargo hold lining of blast absorbent resistant material, the use of blast valves covering or controlling passages providing vents between the aircraft hold and passenger cabin and the use of lightweight blast absorbing material in open channels may be employed in the second form of the invention.

In the second form of the invention each luggage container may be adapted to be interlocking with each of the adjacent containers in the same longitudinal row. Blast attenuating material, e.g. vermiculite, may be located between adjacent containers (either between all containers or adjacent containers at selected intervals) to enhance the attenuation of the blast wave travelling along the cargo hold. Desirably, the upper and lower extremities of the spaces between containers are blocked by blast resistant material to prevent leakage of the blast in an upward or downward direction. Conveniently, on the weakened side face of one selected container there may be provided an edge in the form of a rim or hood which fits over the adjacent weakened side face of the next container which permits interengagement and lagging with the blast resistant material.

The strengthened faces of the luggage container and the aircraft hold liner may be trade of and/or reinforced by blast resistant material preferably in the form of a composite of a lightweight foamed or cellular material and of an impact resistant material having holes therethrough as described in a copending international Application of even date by the present Applicants based upon UK Patent Application Nos. 8925192 and 8925194.

The bubbles or cells of the foamed or cellular material together with the holes of the impact resistant material form a multiplicity of air paths through which air can be vented. If the blast absorbent material according to the present invention is subjected on one side to air in a blast wave the size and number of the air paths will attenuate the blast wave so that the pressure versus time characteristic of the blast is converted from a narrow pulse of very high intensity to a wide pulse of much lower intensity.

The foamed or cellular material is preferably a material which is substantially rigid under moderate pressure but is crushable under high pressure (e.g. associated with a blast wave). It may alternatively be a material whose shape has an elastic memory so that when the material is compressed it has energy to perform work against the blast to restore its shape.

The use of plastics which decompose to give toxic products is preferably avoided so that any fireball associated with the blast does not release such products from the composite material into the surrounding atmosphere.

Preferably, the density of the foamed or cellular material is in the range 0.05 to $0.35 \times 10^3$ kg per m$^3$. The average foam bubble or cell size is preferably in the range 0.01 mm to 2 mm and is produced by a process in which the bubble or cell size is capable of being controlled and reproduced.

The foamed or cellular material may for example be an open or closed cell foam, e.g. made of an organic or inorganic material such as polyethersulphone, foamed silica, foamed mica and the like.

The foamed or cellular material may itself be contained in the cells of a rigid cellular, e.g. honeycomb material.

The lightweight impact resistant material of the said layers is desirably a rigid material imparting structural strength to the composite material. The material may be a layer of solid lightweight material, e.g. a lightweight metal and/or fibre reinforced composite layer, having holes formed therethrough. Alternatively, the material may be a layer of a lightweight metal and/or composite layer which is manufactured as a multi-tubular or multicellular structure. For example, such material may comprise a reticulated or honeycomb structure. It may be made of a lightweight metal (e.g. aluminium or aluminium alloy e.g. 25 um to 100 um thick and/or fibre reinforced composite material. Honeycomb of fibre reinforced composite material may be made for example by the method described in UK Patent Application No. GB 2058661B. Preferably the cells, e.g. honeycomb, cells in such a structure have an average diameter between opposite sides of from 5 mm to 20 mm.

Where the impact resistant material comprises a multitubular, reticulated or honeycomb structure the cellular walls of the structure preferably have holes formed therethrough so that air and other gases in a blast can diffuse literally throughout the structure.

Preferably, the positions of transverse holes through adjacent layers of the impact resistant material are staggered relative to one another especially in the case where the holes are formed from a solid sheet or layer of impact resistant material whereby the path length for gas to travel through the transverse holes of the layered structure is enhanced, preferably maximized. For example, a multilayer structure may be formed from impact resistant material having two different hole patterns therethrough, the patterns of the two types appearing alternately in adjacent layers.

The impact resistant material may for example comprise an impervious, fire resistant fibre-reinforced composite, for example a thermosetting or thermoplastic polymeric matrix material reinforced with fibres selected from glass, carbon, polyamide, polyolefin, polyaramid and the like or blends thereof.

Preferably, the density of the impact resistant material is less than $2 \times 10^3$ kg per m$^3$, desirably less than $1 \times 10^3$ kg per m$^3$.

The fibres employed to provide a fibre-reinforced composite may be woven or unwoven, short or elongated fibres. They may be deposited randomly in the matrix or in a uniform pattern. However, the mechanical properties of the resultant sheet employed to provide each layer preferably (although not essentially) are substantially uniform in each direction along its surface.

Glass fibre reinforced epoxy resin provides a suitable thermosetting composite material for the layers of impact resistant material where these are provided from solid layers. Layers of this material having a thickness of from 0.5 mm to 5 mm, e.g. from 1 to 2 mm are especially suitable. Another preferred material comprises a suitable known thermoplastic elastomer laminate e.g. formed from polyethersulphone containing layer(s) embedding polyaramid fibres.

The said holes where formed through layers of impact resistant material may be from 0.2 to 5 mm, e.g. 0.5 mm to 2 mm diameter. Such holes are preferably cylindrical and of circular cross-section but they could also have other shapes and have a cross-section which varies through the layer. The holes my be formed by any convenient process, e.g. by punching or pressing layers containing no holes or by moulding a composite around pins or other projections which may be removed from the composite when moulded. Preferably between 30% and 70%, e.g. about 50% of the surface area of the layer of impact resistant material is formed of solid material (the holes forming the reminder of the surface area).

The holes or cells of the impact resistant layer may themselves be filled partially or wholly with a lightweight formed or cellular polymeric material.

The interface between adjacent layers of foamed or cellularpolymeric material and of impact resistant material or between adjacent layers of impact resistant material my be lined with a frangible sheet e.g. of metallic material, for example aluminium or aluminum alloy foil, e.g. 20 to 100 micrometers thick. Such foil may be included only at selected interfaces, e.g. only adjacent to the first two or three foamed or cellular layers adjacent to that surface of the multilayer structure which will be subjected initially to blast pressure. The likelihood of blast pressure shearing the metallic layers at interfaces between layers more distant from the initially subjected surface is thereafter considerably reduced.

Preferably the surface of the composite material which will be subjected to blast does not include aluminum, any aluminum being separated therefrom by other, preferably fire-resistant material.

The blast resistant composite material may include one or more optional layers of a fire-resistant unreinforced plastics sheet, e.g. from 0.5 mm to 1.5 mm thick, with holes formed therethrough so that between 30 percent and 70 percent of the surface area of the sheet is occupied by the openings of the holes. The hole sizes may vary throughout the sheet e.g. In a range of hole diameters from between 5 mm and 0.1 mm, e.g. between 1 and 5 mm at the upper end to between 0.1 and 0.5 mm at the lower end, the number of holes for each size increasing as the size decreases. Such sheets may for example be made of a tough thermoplastic material such as polycarbonate, polyethersulphone, polyester or PEEK. Such sheets may be provided between the layers of impact resistant material and the cellular or foamed material.

The surface of blast resistant/absorbent composite material which is to be subjected to blast (in the event of an incident) may be formed of one of the said perforated plastics sheets.

Where the composite material includes perforated flexible plastics sheets such sheets may be bonded to adjacent layers of foamed or cellular material and impact resistant material at a relatively small number of bonding sites so that resistance to airflow through the structure is minimised. For example the total surface area of the bonding sites may be less than one tenth of the surface area of the plastics sheet (including holes formed therethrough).

The individual layers incorporated in the composite material may be bonded together by various of the techniques or processes well known in the composites art which may be performed without substantial compression of the foamed or cellular layers. For example, layers may be bonded by bending agents such as thermosetting, e.g. epoxy, or cold setting, e.g. polyester resins or by light thermal bonding.

Container structures formed from composite material present invention may be further strengthened by overwinding the multilayers in a known manner with strengthening fibres e.g. of carbon and/or polyaramid embedded in a suitable bonding resin.

BRIEF DESCRIPTION OF THE DRAWINGS

Embodiments of the present invention will now be described by way of example with reference to the accompanying drawings, in which:

FIG. 1 is a perspective view of an aircraft luggage container embodying the first form of the present invention.

FIG. 2 is a cross-sectional end elevation of a removable loading door employed in the container shown in FIG. 1.

DETAILED DISCUSSION OF PREFERRED EMBODIMENTS

Figure 3:
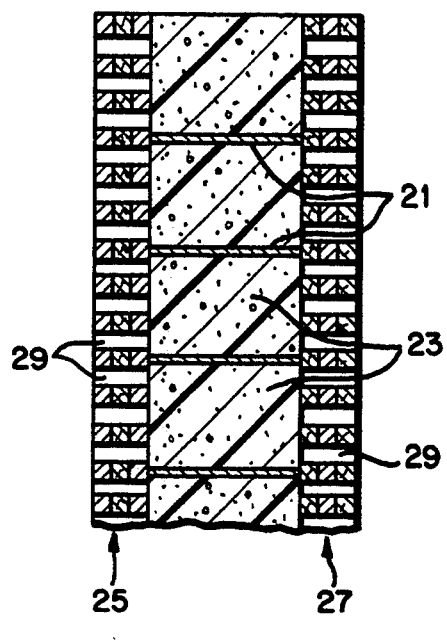
FIG. 3 is a cross-sectional end elevation of a laminate material employed in walls of the container shown in FIG. 1.

As shown in FIG. 1, a luggage container 1 has an upper face 3, a lower face 5, an outward facing (relative to the front of the aircraft) end face 7, an inward facing end face 9, a forward facing side face 11 and a rearward facing side face 13.

The faces 3, 5, 9, 11 and 13 are all made of and/or reinforced by strong, blast resistant material whilst the face 7 which is located adjacent to the hull of the aircraft (not shown) is made of relatively weak material, e.g. thin metal or thin fibre reinforced composite material.

The lower face 5 is curved upward where it meets the outer facing end face 7 conveniently allowing the surface area of the outer facing end face 7 to be reduced (relative to the other faces) and allowing the area blown open by blast to be minimised.

The rearward facing side face 13 includes a removable door 15 which is shown in more detail in FIG. 2. The door 15 includes a concave upper portion 15a which includes, on its inside facing surface, blast suppression pads 14 made for example of foam rubber. The door 15 fits over a loading aperture 16a formed in a frame 16 inside the face 13 of the container 1. The relative overlap between the door 15, the frame 16 and the face 13 are shown in the lower part of FIG. 2.

A security strap 19 is banded around the faces 3, 5, 11 and 13 at their ends distant from the weakened face 7 in order to strengthen those faces at that end whereby any failure of those faces is likely to be at their end adjacent to the weakened face 7.

The laminated material which is shown in FIG. 3 is one example of material which forms or lines the faces other than the weakened face 7 of the container 1. The material comprises aluminium/aluminium alloy honeycomb layers 21 e.g. made of Type 3003 Al alloy foils 38 to 76 micrometers thick to BS 1470, filled with a rigid or compressible non-inflammable plastics foam 23, the filled layers 21 themselves being contained between sandwiches 25, 27 each comprising alternate layers of aluminium or aluminium alloy and a high strength, high modulus fibre reinforced composite, e.g. polyaramid and/or carbon fibre reinforced polymeric material. The sandwiches 25, 27 have holes 29 formed therethrough. As shown in FIG. 3, one of the sandwiches 25 is formed of fibre reinforced composite/aluminium/fibre reinforced composite layers and the other sandwich 27 is formed of aluminium/fibre reinforced composite/aluminium layers although these two sandwiches may be optionally interchanged or one substituted for the other.

Preferably the plastics foam has a cellular structure having cells of from 0.1 mm to 2.0 mm average size, the average thickness of the foam layers being 10 mm to 55 mm. The honeycomb cells have a side to side measurement of from 5 mm to 20 mm, typically 10 mm.

The layers of the sandwich shown in FIG. 3 may be bonded together by epoxy resin adhesive.

Figure 4:
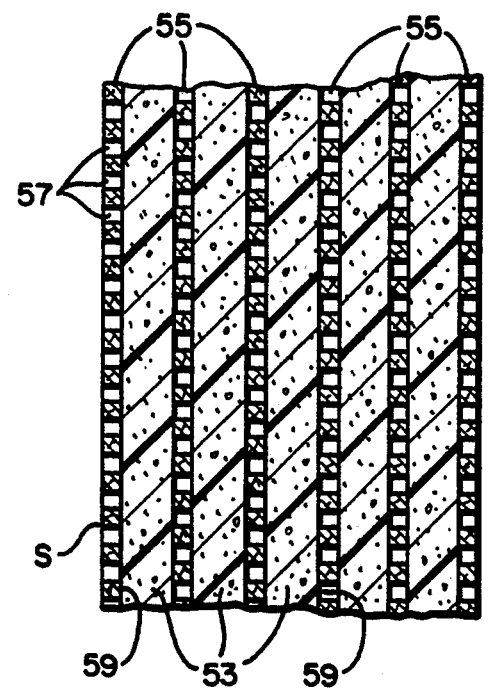
FIG. 4 is a cross-sectional end elevation of an alternative laminate material which may be employed in walls of the container shown in FIG. 1.

The alternative composite material shown in FIG. 4 comprises layers 53 of a rigid, reticulated plastics foam typically (1-2) mm thick, alternating with layers 55 typically 1 mm thick, of a glass fibre reinforced plastics material, e.g. epoxy resin, each having a multiplicity of holes 57 of approximate diameter 1 mm therethrough. The holes 57 in adjacent layers 55 are offset relative to one another so that the shortest path length between any one pair of holes 57 in adjacent layers 55 is maximised.

The outer layers of the laminate are formed by layers 55 and these outer layers may be slightly thicker, than the layers 55 inside the laminate, e.g. 1.5 mm thick.

Layers of aluminium are deposited at or aluminium foil adhered to the first six interfaces between the layers 55 and 57 nearest the outer surface labelled S which in use will be the surface upon which any blast to be absorbed by the material will first be incident.

The various layers of the composite material shown in FIG. 4 are bonded together e.g. by an epoxy resin adhesive (not shown).

Figure 5:
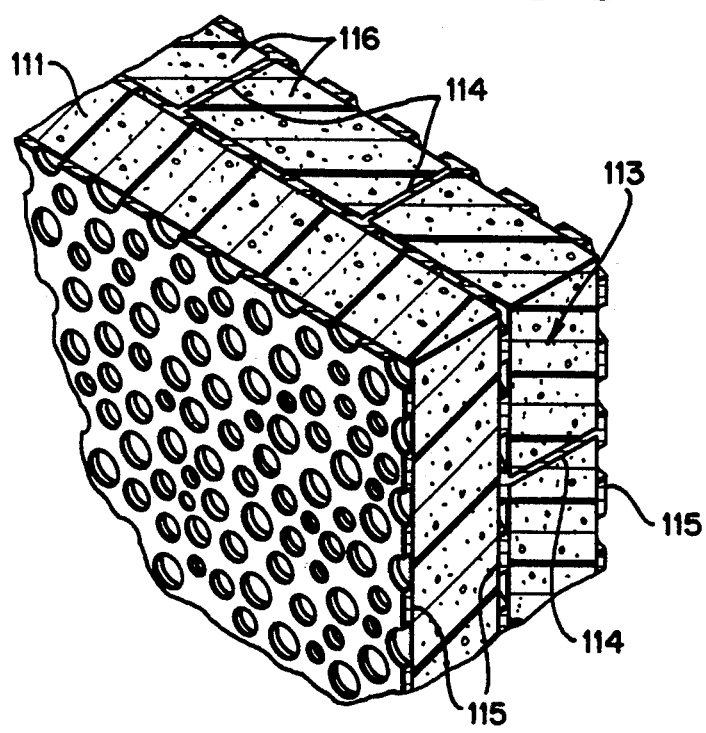
FIG. 5 is a perspective view of an alternative laminate material.

The composite material shown in FIG. 5 comprises layers 111 of nonflammable foamed plastics material alternating between aluminium or aluminium alloy honeycomb layers 113. The layers 113 contain nonflammable foamed plastics material 116 in the cells 114 of the honeycombs. The foamed plastics material in the layers 111 and 113 may be the same material typically 5 mm to 15 mm thick having a density of from 0.05 mm to $0.35 \times 10^3$ kg per $m^3$. The foam bubble size is between 0.01 mm and 2 mm.

The aluminium or aluminum alloy from which the honeycomb is formed may for example have a thickness of from 38 to 76 micrometers. It is perforated with holes of diameter between 0.5 and 1.5 mm to no more than 50 percent of its surface area.

Layers 115 of (unreinforced) fire-resistant plastics sheet are provided at the inner surface of the laminate (that which will be exposed to any blast) and interfaces between the layers 111 and 113. The layers 115 are perforated with holes formed randomly of different diameter so that the area of plastics material remaining is not less than 50 percent of the surface area of the sheet. The holes vary in size from about 0.5 mm to 5 mm. The number of holes of each size is roughly in inverse proportion to the size of the holes.

The various layers 111, 113 and 115 of the laminate shown in FIG. 5 are bonded together by one of the methods described above.

Figure 6:
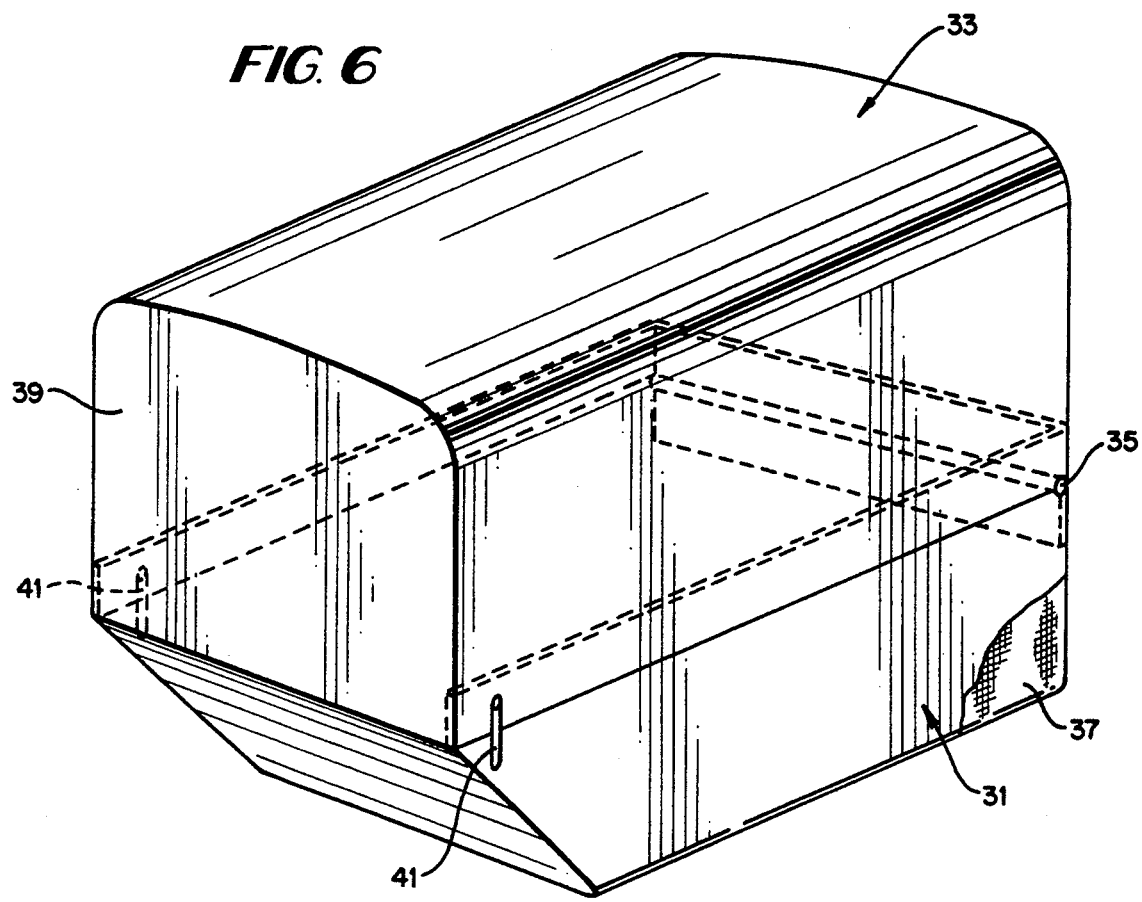
FIG. 6 is a perspective view of an alternative aircraft luggage container embodying the first form of the present invention.

An alternative luggage container embodying the present invention is shown in FIG. 6. In this case, the container comprises a fixed lower portion 31 and an upper portion 33 hinged to the lower portion 31 by a hinge 35 protected by a fibre reinforced composite cloth 37. The upper portion 33 operates in the manner of an alligator jaw.

The upper portion 33, which when hinged open allows luggage to be placed inside the container, contains an end face 39 which performs the same function as the weakened face 7 in FIG. 1. Thus, apart from the face 7, the upper portion 33 and the lower portion 35 are formed of or reinforced by a reinforcing material such as that described with reference to FIG. 3, FIG. 4 or FIG. 5.

Figure 7:
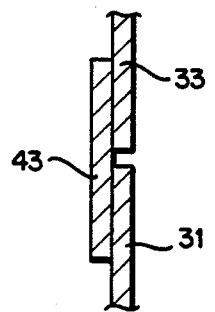
FIG. 7 is a cross-sectional end elevation of part of the walls of the container shown in FIG. 6.

The upper portion 31 may be retained in a closed position by catches 41. As shown in FIG. 7, the upper and lower portions, 31, 33 are closed together by an auxiliary overlap portion 43 (either attached to the lower rim of the upper portion 31 or to the upper rim of the lower portion 33) so that blast leakage may be eliminated at the joint between the two portions 31, 33.

Figure 8:
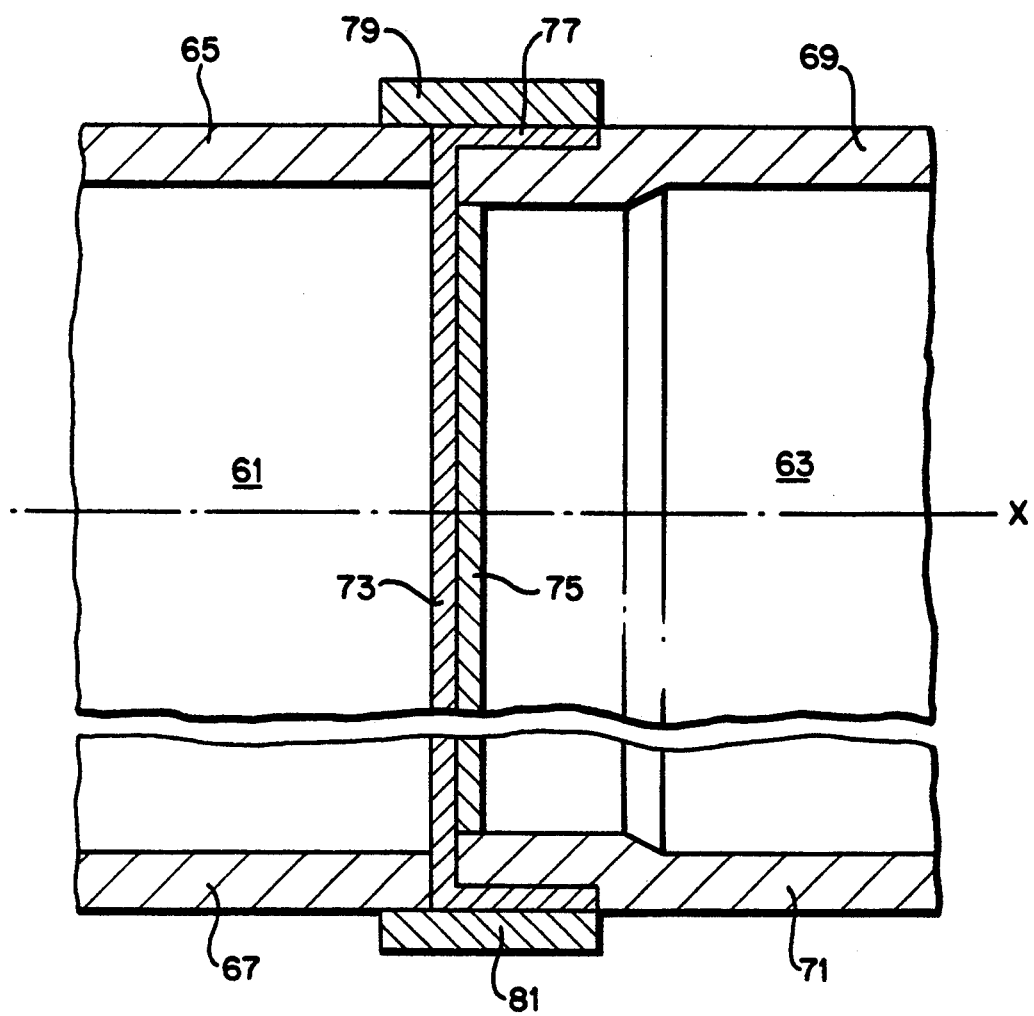
FIG. 8 is a cross-sectional side elevation of interengaging luggage containers embodying the second form of the invention.

The alternative luggage container arrangement shown in FIG. 8 comprises a container 61 which interlocks with a container 63 in a row (others not shown) of interlocking containers. The container 61 includes a top face 65 and a bottom face 67 made of one of the blast resistant composite materials used in the embodiments described above. Likewise the container 63 contains a top face 69 and a bottom face 71 of similar material. The containers 61, 63 have weak end faces 73, 75 respectively which are formed of low strength material, e.g. thin metal or plastics material. A rim 77 is formed around the edge of the end face 73 and the faces 69 and 71 are engaged inside the rim 77 to provide interlocking. Further blast resistant material 79, 81 is provided over the top and bottom surfaces of the rim 77.

In the event of detonation of an explosive device the weak end faces 73, 75 will fall and the blast will travel longitudinally along the aircraft in the manner described above. The side faces (not shown) of the containers 61, 63 are also blast resistant to ensure this effect occurs as required. The faces 65, 67, 69, 71 and the blast resistant material 79, 81 prevent leakage of the blast in an upward or downward direction relative to the longitudinal axis of the aircraft (axis X as shown in FIG. 8).

I claim:

1. An aircraft cargo container for transporting cargo in an aircraft, said aircraft having an aircraft hull, said hull having a longitudinal axis, said container comprising:

a plurality of strengthened faces, said strengthened faces comprised of a blast resistance/absorbent material; and at least two weakened faces, said strengthened and at least two weakened faces comprising a means for generally directing blast energy from a detonation within said container out of said container and to an adjacent region of the aircraft hull and in a direction along said longitudinal axis to an adjacent container in a longitudinal row.

2. An aircraft cargo container according to claim 1, wherein said container includes means for interlocking with said adjacent container in a longitudinal row.

3. An aircraft cargo container according to claim 2 wherein there are upper and lower extremities of spaces between the containers, further including blast resistant material blocking said upper and lower extremities of space and to prevent leakage of blast in an upward or downward direction.

4. An aircraft cargo container according to claim 2 wherein on at least one of said weakened faces of said container there is provided an edge in the form of a rim or hood which is adapted to fit over the adjacent weakened face of said adjacent container which permits interengagement and lagging with blast resistant material.

* * * * *